(No Model.)

S. J. COX.
DEVICE FOR SALTING CATTLE.

No. 321,582. Patented July 7, 1885.

WITNESSES:

Stephen J. Cox INVENTOR

UNITED STATES PATENT OFFICE.

STEPHEN J. COX, OF NEW YORK, N. Y.

DEVICE FOR SALTING CATTLE.

SPECIFICATION forming part of Letters Patent No. 321,582, dated July 7, 1885.

Application filed April 19, 1884. (No model.)

*To all whom it may concern:*

Be it known that I, STEPHEN J. COX, a resident of the city, county, and State of New York, have invented a new and useful Device for Salting Cattle, of which the following is a specification.

My invention consists of a perforated revolving cylinder to hold the salt, within the cylinder a toothed or spurred bar as a means to prevent the salt becoming packed by moisture, and a partial casing or frame serving to protect the revolving cylinder from being bitten by the cattle, also protecting the moving parts of the device from the elements, and said frame being provided with an apron to receive such salt as may fall from the cylinder. The said frame or casing is provided with lugs, whereby it may be readily attached to a wall or other suitable place, and it forms the medium for holding the other parts of the device together. The revolving cylinder is provided with a cover, removable when desired to admit of supply when exhausted. The licking of the cylinder by the cattle causes it to revolve, while the bar provided with spurs remains quiet.

The object of the invention is to provide for salting cattle at their own will and pleasure by a device that will keep the salt in proper condition without waste.

Figure 1:
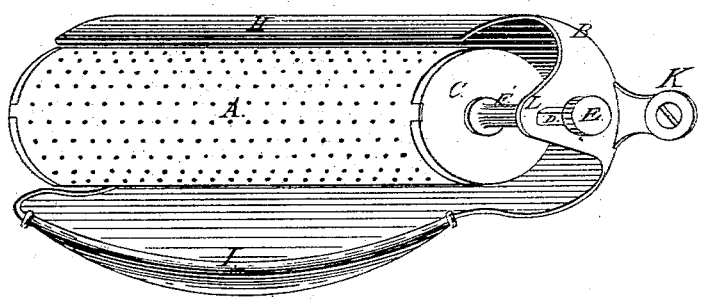
Figure 2:
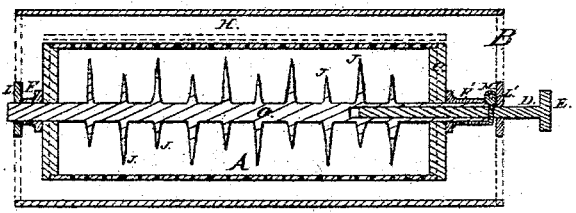

In the accompanying drawings, Figure 1 is a perspective view of the device outside, showing the casing frame or covering with its apron or saving-basin and the revolving perforated cylinder, within which is the spurred bar. Fig. 2 is a vertical sectional view of the same, showing all the parts except the apron.

A represents the revolving cylinder intended to contain the salt, its entire circumference being perforated to admit of the passage of the salt when the cylinder is agitated or licked by the cattle.

B represents the casing or frame partially inclosing the cylinder, covering and protecting it and the other parts of the device from the weather, serving also to hold the same, and as the means for securing the same to a wall or other suitable place.

C is a removable cover admitting supply of salt when exhausted.

D is a square pin passing into the axle G and through the support L', to insure the stability of the said axle and permit the removal of cover C.

E is the knob of the pin D to facilitate its removal.

F and F' are washers to insure the easy turning of the cylinder A. The one, F', at the same time secures the cover C in its place by the aid of a perforated pin, M, which is passed through a hole in pin D, and, by pressing against washer F' and support L', keeps both cover C and knob E in the required position. The perforation shown in pin M in Fig. 2 permits of the introduction of a wire for its removal.

H is a portion of the casing or frame B, extending over the cylinder A as a covering to prevent injury from biting by the cattle.

I is the apron or basin serving to catch any salt dropping from the cylinder A and prevent waste.

G is a rod or bar forming the axle of the cylinder A, and is provided with any desired number of spurs or teeth, J, to prevent the packing of the salt by moisture. As the cylinder is turned by the cattle the teeth or spurs agitate the mass of salt within, breaking it up and serving to keep it in proper condition for presentation at the perforations in the cylinder A.

K represents lugs or extensions from casing or frame B, by which it may be readily secured to a wall or other place where desired.

L' L' are the supports for the pin D and axle G, on which the cylinder rotates. They are formed in the casing B.

The several parts of the device may be made of any suitable metal or material.

The revolving cylinder, instead of being formed of perforated sheet metal, as shown, may be partially or wholly composed of wire-gauze.

What I claim as new, and desire to secure by Letters Patent of the United States, is—

A device for salting cattle, consisting of the supporting-frame B, provided with the apron I, extension H, and supports L L', and rod or bar G, provided with spurs J, the perforated cylinder A, having cap C, the pin D, provided with knob E, the washers F F', and pin M, substantially as shown and described.

STEPHEN J. COX.

Witnesses:
A. A. CARD,
AD. GUSTAVE WAUGNER.